United States Patent Office 3,437,367
Patented Apr. 8, 1969

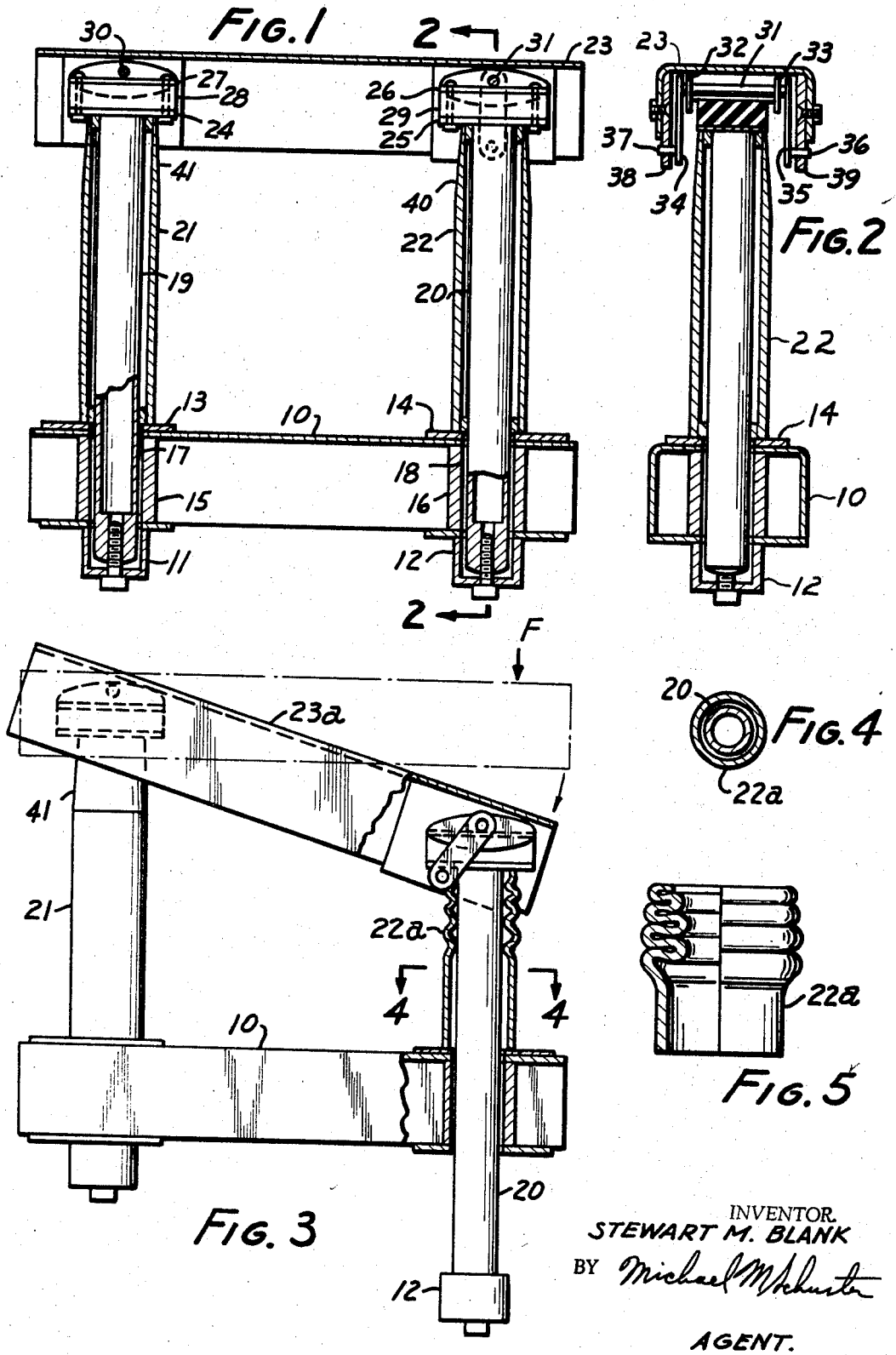

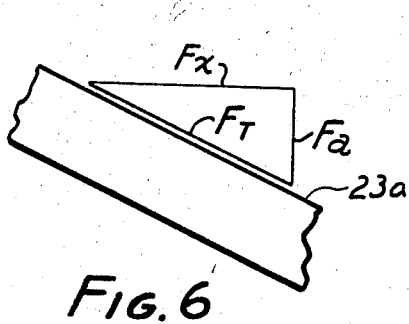
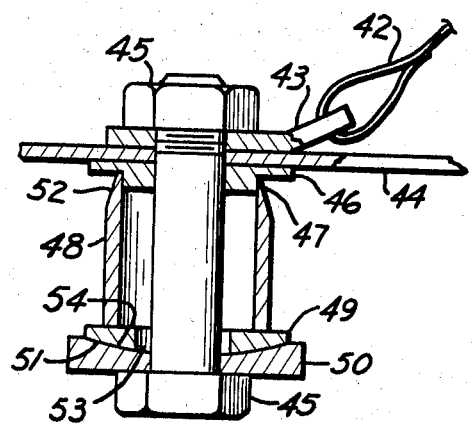
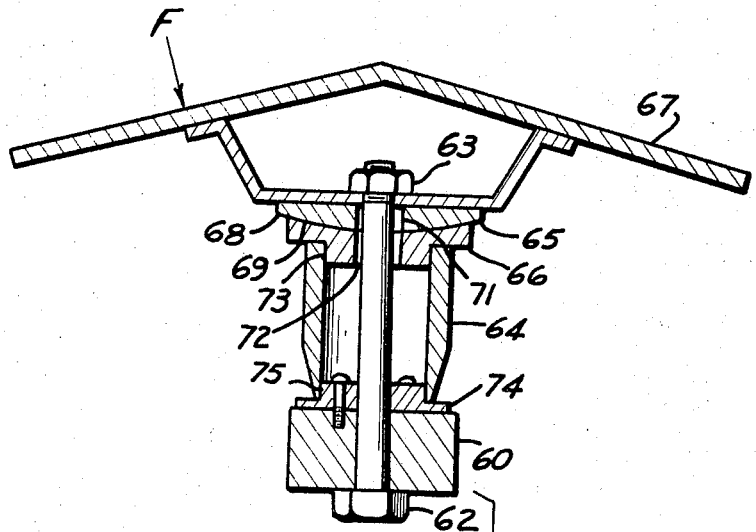
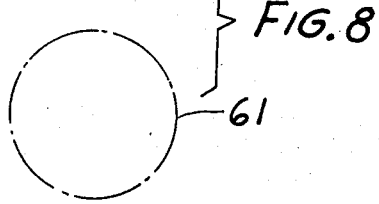
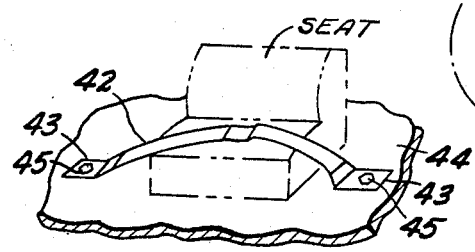

3,437,367
DEFORMED SHOCK ABSORBING DEVICES
Stewart M. Blank, 4634 Manhattan Beach Blvd.,
Lawndale, Calif. 90260
Continuation-in-part of application Ser. No. 507,626,
Oct. 22, 1965. This application Feb. 27, 1967, Ser.
No. 618,976
Int. Cl. B60r 19/06
U.S. Cl. 293—70                                    5 Claims

ABSTRACT OF THE DISCLOSURE

This invention relates to a deflecting bumper assembly incorporating energy absorbing devices to lessen the effect of impact energy. According to this invention, a bumper, such as may be used on a vehicle, is mounted to the frame of the vehicle through energy absorbing devices. The mounting includes pivotal members, such as levers and pins, which allow the bumper to swing in the direction of impact when a non-symmetrical impact load is applied to the bumper, thus deforming one of the energy absorbing members more than any other in the mounting. Allowing the bumper to swing freely, in this case, prevents damage to the bumper, thus deforming one of the energy absorbing transmitted to the vehicle frame. Allowing the bumper to deflect will also permit the bumper to act as an inclined plane, allowing the object which is producing the impact on the bumper to slide away from the vehicle. The deformable energy absorbing members are cylindrical tubular members, having tapered ends to absorb smaller shock loads, with increasing resistance through distance of deflection. The device is adapted to be applied in positions to protect structures such as buildings and telephone poles, as well as to absorb the energy imposed on seat belt devices in vehicles.

---

This application is a continuous-in-part of applicant's copending application Ser. No. 507,626, filed Oct. 22, 1965, and now U.S. Letters Patent No. 3,307,868 issued Mar. 7, 1967 entitled Energy Absorbing Vehicle Bumper Assembly, which in turn is a continuation-in-part of applicant's application Ser. No. 328,880, filed Dec. 9, 1963, now abandoned, said application Ser. No. 507,626 also being a continuation-in-part of applicant's application Ser. No. 432,736 filed Feb. 15, 1965 and now U.S. Letters Patent No. 3,268,256 issued Aug. 8, 1966, entitled, Safety Shock Absorber Systems.

An object of this invention is to provide an energy-absorbing bumper assembly which will decrease the impact effect in a collision. A further object of this invention is to provide a safety bumper which would allow energy absorbing deformable members to yield non-symmetrically in the case of application of a non-symmetrical impact load.

A further object of this invention is to allow a bumper to swivel in the direction of an applied impact force so that the force may divide itself into components which tend to separate the colliding objects.

A further object of this invention is to provide a safety bumper which can be applied to land, sea or air vehicles or to protect stationary objects against collisions by, and with, moving vehicles by adjusting deformation capabilities of the energy absorbing members of the safety device to provide for the predicted impact loads that might be encountered due to the projected size, weight and speed of the moving vehicle or objects.

Still another object of this invention is to provide deformable members in shock absorber devices which will fail progressively at varying strain rates to provide an energy absorbing cushion to impact under the first shock and which will gradually intensify resistance to the increased impact load as the energy of the impact increases to a peak before cessation of movement or the start of rebound.

A full understanding of the aforementioned objects of the invention and of further objects and advantages as well as those cited will be gained by reference to the following description and accompanying drawings in which:

FIG. 1 is a top-plan view of the energy absorbing bumper, shown attached to a fragmentary view of a truck frame;

FIG. 2 is a fragmentary, sectional view taken on line 2—2 of FIG. 1;

FIG. 3 is a top-plan view of the energy absorbing bumper during impact;

FIG. 4 is a sectional view taken on line 4—4 of FIG. 3;

FIG. 5 is a view of an energy absorbing member shown after partial collapse;

FIG. 6 is a vector diagram shown with a fragmentary top-plan view of the energy absorbing bumper of FIG. 3;

FIG. 7 is a side elevation partially in cross-section of another embodiment of the invention shown with a seat belt;

FIG. 8 is a top-plan view of another embodiment of the invention positioned to protect a telephone pole which is shown in phantom; and FIG. 9 is an elevation in perspective of the embodiment of FIG. 7 shown in relation to a seat which is shown in phantom.

Although this invention is not limited to automotive vehicles, as it may applied to fenders or bumpers on any vehicle subject to collision shock, such as the fenders on a boat, and further, it may be applied to such stationary objects as telephone poles, to prevent damage by colliding vehicles, FIG. 1 illustrates the invention as it would be utilized on a truck body.

In FIG. 1 a segment of a truck frame 10, is equipped with reinforcing plates 13 and 14. Reinforcing bushings 15 and 16 have a longitudinal bore 17 and 18, which helps to support and guide shaft members 19 and 20 which are equipped with stops 11 and 12. Deformable tubes 21 and 22 are located coaxially with mounting shafts 19 and 20 and act as spacers between truck frame 10 and bumper 23. The deformable tubes 21 and 22 abut impact plates 24 and 25. Impact plates 24 and 25 form a sandwich with resilient pads 28 and 29 and plates 26 and 27. Trunnion pin 31 is supported by pivot plates 32 and 33, with trunnion pin 30 similarly supported. To rocker arms 34 and 35, as shown in FIG. 2, as well as matching rocker arms on the other side of bumper 23, the two trunnion pins 31 and 30 are fixed. Pivot pins 36 and 37, as shown in FIG. 2, are fixed to rocker arms 34 and 35. Pivot pins 36 and 37 engage plate members 38 and 39 with swivel fit. Plates 38 and 39 are in turn mounted to bumper 23, thus completing the assembly. FIG. 3 illustrates a force F acting on bumper 23, as can be seen from the force diagram, FIG. 6. The tilting of the bumper 23, under the eccentric load F produces force components which may be resolved perpendicular to the primary force with a force $F_x$ and a resultant force $F_t$ drawn parallel to the inclined surface of bumper 23. This illustrates the effect the swivel bumper would have in shunting aside the object providing the impact force F on bumper 23.

In a collision that would not exceed the impact load capacity of the maximum strength of the deformable tubes 21 and 22, the bumper 23 would act as a conventional automotive bumper to absorb shock. Under heavier impact load which would exceed the yield strength as a column of the deformable tubes 21 and 22, the bumper 23 would push back on the shaft members 19 and 20, which are slidably mounted to the frame 10 and restrained by stops 11 and 12 and the deformable tubes 21 and 22 would collapse in the manner shown in FIG. 3, as shown by colapsed tube 22a, failing as a column to the extent necessary to absorb the energy of the impact.

Since it is recognized that the sharpest impact load on the occupants of a vehicle would be at the beginning of the collision time in any rigid system, the deformable tubes 21 and 22 are tapered at one end 40 and 41, so that deformation failure will begin at a lower load at the instant of impact and energy will be dissipated during the first minute intervals of time of the total collision time, and the dissipated energy will gradually build to meet the peak values of shock energy as the tapered ends 41 and 40 yield under the load and the load is gradually transferred into the heavier sections where further deformation occurs to absorb the remaining energy of the impact load.

A further advantage of the tapered ends 40 and 41 provides protection at low speed collisions which can produce injuries or damage in a manner similar to high speed collisions.

In tests to prove the effectiveness of the tapered deformable tubes 21 and 22, a specimen approximately 10 inches long was prepared, having one end tapered from the outside diameter of 2 inches and a wall thickness of .125 to a wall thickness of .065 at the end for a distance of two and three-quarter inches. Specimen 1 was made of 6061–0 Aluminum Alloy and specimen 2 was made of 6061–T4 Aluminum Alloy. The results of the tests were as follows for compression load to fail the member:

| Fold | Specimen 1 (lbs.) | Specimen 2 (lbs.) |
| --- | --- | --- |
| 1 | 7,600 | 11,100 |
| 2 | 10,340 | 17,000 |
| 3 | 10,830 | 24,100 |
| 4 | 12,700 | 28,900 |
| 5 | 14,100 | 29,500 |
| 6 | 15,040 | 31,100 |
| 7 | 16,200 | 35,500 |
| 8 | 16,800 | 35,000 |
| 9 | 17,700 | |

It can be seen that a smaller initial impact load will produce failure until the uniform section is reached and then the resistance increases sharply until it reaches a fairly uniform rate of increase and a final leveling off of resistance load.

One of the advantages of this invention resides in the fact that the deformable tubes 21 and 22 may be easily replaced after they have been compressed in a collision, thus repairing and restoring the assembly to its initial state. Resilient pads 28 and 29 hereinbefore described, help to smooth out minor impacts encountered by the bumper and help to distribute the load equally across the deformation tubes 21 and 22 under eccentric loaded conditions.

Another embodiment of the invention is shown in FIG. 7, where the shock absorver system is used to anchor a seat belt in a vehicle. The seat belt 42 is mounted to a bracket 43 which is in turn mounted to the vehicle floorboard 44 by bolt 45. A stepped washer 46 reinforces the floorboard and the reduced diameter 47 of the stepped washer helps to maintain deformable tube 48 in concentric arrangement with the bolt 45. A pair of spherically seated washers 49 and 50, with matching spherical faces 51 will allow the bolt to swivel under an eccentric load applied by the brackets 43 under tension of the seat belt 42 during a collision or other accident. Spherical washer 50 having the concave portion 54 of spherical surfaces 51 engaging the concave portion of the spherical washer 50 will adjust itself in position with the shifting of bolt 45 under load so that spherical washer 49 will apply an equal load across the face of deformable tube 48. The tapered nose 52 of deformable tube 48 will allow absorption of energy under lighter impact loads or a combination of lower speed of impact and higher weight of the individual restrained or of higher speed of impact and lower weight of the individual restrained by the seat belt 42. Spherical washer 49 must have clearance bore 53 in order to provide for movement of the bolt 45.

FIG. 8 shows a further embodiment of the invention by illustrating how the shock absorbing device may be used to prevent damage to a telephone pole from collision by a vehicle. A post 60 is placed in front of the pole 61 with sufficient room to permit movement of bolt 62. Bolt 62 and nut 63 are used to fix deformable tube 64, spherical washers 65 and 66 and bumper 67 to the post 60. In the case of an impact load F applied to the bumper 67 the bumper would tilt to meet the direction of the load, swiveling on spherical washer 65 and distributing the load across matching spherical washer 66 into deformation tube 64, thus absorbing the energy of impact by deformation of the material and deformable tube 64. Spherical washers 65 and 66 have matching spherical faces 68 and 69 and clearance holes 71 and 72 through washers 65 and 66 permit swiveling action of the washers. A reduced diameter on spherical washer 66 maintains relative position of deformable tube 64 to the washers, while washer 74 which is fixed to post 60 reinforces post 60 and further has a reduced diameter 75 which locates deformable tube 64 with respect to the post 60 and bolt 62. It is to be understood that several of such assemblies can be disposed around an object to be protected from collision impacts and the one shown is in the way of illustration only. Such assemblies could also be mounted directly on the structure to be protected.

It is to be understood that the described invention having been shown as applied to the bumper of a truck, a seat belt, and a protective bumper can also be applied to fenders on boats and barges or to airbone vehicles such as helicopters which might have such devices applied to landing apparatus such as wheels and skids.

It is to be understood that the scope of this invention is not limited by the typical descriptions of the applications given but may be varied to accomplish other objects, advantages and embodiments that come within the appended claims.

I claim:
1. A shock absorber device for mounting on structure which comprises:
   (a) impact receiving means;
   (b) a shaft member, said impact receiving means mounted to said shaft member and said shaft member slidably mounted to said structure, said shaft member adapted to slide in a direction toward said structure;
   (c) a deformable member, said deformable member adapted to be mounted between said structure and said impact receiving means, said deformable member in the shape of a tube, said tube member having a first end and a second end, said first end having the external shape of a frustrum of a cone for a portion of the total length of said tubular deformable member, said conical shape being co-axial with said tubular member, said tubular deformable member adapted to be mounted concentrically of said shaft member, said tube member having a wall thickness with a dimensional ratio to the diameter and length of said tube member adapted to produce a columnar buckling failure, said deformable member adapted to prevent sliding motion of said shaft member until the yield strength of said deformable member is exceeded in impact energy; said deformable member adapted to fail in compression under a load which increases proportionately with deformation distance for at least one portion of the total deformation distance capability of said deformable member.

2. Apparatus as described in claim 1 which includes said impact receiving means in the form of a bumper member.

3. Apparatus as described in claim 1 which includes swivel washer means, said swivel washer means mounted coaxially with said shaft member, said swivel washer means abutting one end of said deformable member and said swivel washer means adapted to transmit impact energy transmitted by said impact receiving means equally to said end of said deformable member.

4. Apparatus as described in claim 3 which includes said impact receiving means in the form of a belt member, said belt member adapted to restrain a body of matter from motion under impact conditions.

5. Apparatus as described in claim 1 which includes said impact receiving means in the form of a belt member, said belt member adapted to restrain a body of matter from motion under impact conditions.

References Cited

UNITED STATES PATENTS

| | | | |
|---|---|---|---|
| 2,024,636 | 12/1935 | Gallina | 293—63 |
| 2,135,749 | 11/1938 | Gullo | 267—1 |
| 2,251,347 | 8/1941 | Williams et al. | 213—221 |
| 2,682,931 | 7/1954 | Young | 188—1 |
| 2,971,566 | 2/1961 | Negroni | 297—302 |
| 2,997,325 | 8/1961 | Peterson | 293—1 |
| 3,006,484 | 10/1961 | Pringiers | 213—220 |
| 3,059,966 | 10/1962 | Spielman | 297—216 |
| 3,136,021 | 6/1964 | Hoffstrom | 280—150 |
| 3,146,014 | 8/1964 | Kroell | 293—70 |
| 3,361,475 | 1/1968 | Villiers | 280—150 |

ARTHUR L. LA POINT, *Primary Examiner.*

H. BELTRAN, *Assistant Examiner.*

U.S. Cl. X.R.

188—1; 213—220; 267—1; 280—150; 293—1, 60, 89; 297—216, 302